March 29, 1927.

J. G. BARKE ET AL 1,622,698

DRIVING MECHANISM FOR SPINNING, DOUBLING, AND THE LIKE MACHINES

Filed Jan. 31, 1923    2 Sheets-Sheet 1

INVENTORS:
John G. Barke
Frederic Hardman
BY Wm Wallace White
ATT'Y.

March 29, 1927.
J. G. BARKE ET AL
1,622,698
DRIVING MECHANISM FOR SPINNING, DOUBLING, AND THE LIKE MACHINES
Filed Jan. 31, 1923   2 Sheets-Sheet 2
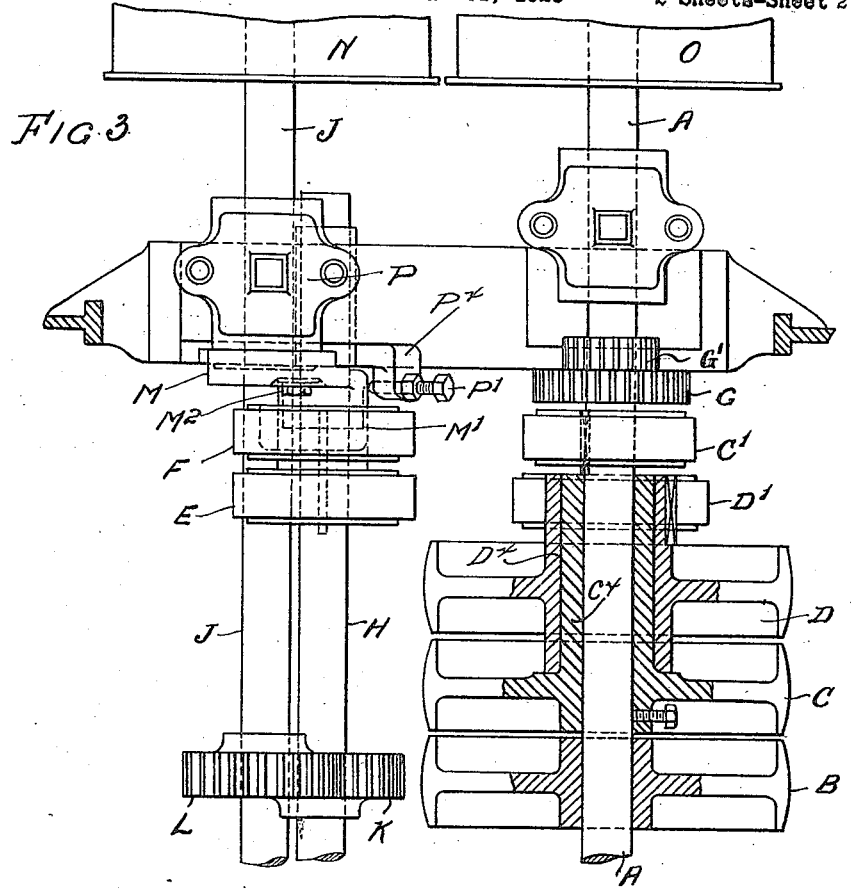
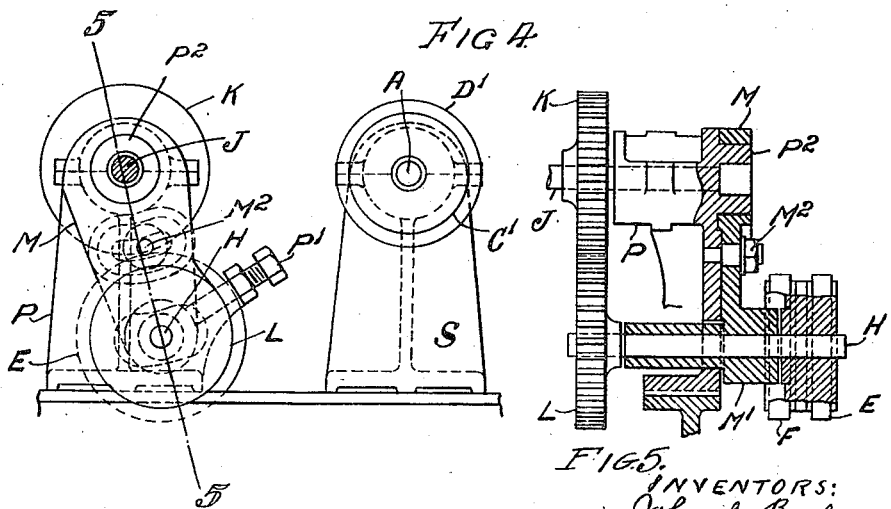

Patented Mar. 29, 1927.

1,622,698

UNITED STATES PATENT OFFICE.

JOHN GEORGE BARKE, OF STOCKPORT, AND FREDERIC HARDMAN, OF BRAMHALL, ENGLAND.

DRIVING MECHANISM FOR SPINNING, DOUBLING, AND THE LIKE MACHINES.

Application filed January 31, 1923. Serial No. 616,009.

Our invention relates to motion transmitting mechanism, and more particularly to mechanism for driving spinning, doubling and like machines producing cops or bobbins with a base foundation or taper ends.

The object of this invention is to provide means for increasing the speed of the spindles after the base or bottom of the cop or bobbin is formed from positively driven tin rollers, the increase of speed for building the large diameter being accomplished without shock or dwell taking place, as in the case where clutches or similar devices are employed.

The second tin roller in spinning and twisting frames is usually frictionally driven by means of belts from the first or positively driven tin roller passing over, in their passage to the spindles, with sometimes a cable connecting the two rollers at the far end of the frame for heavy or long frames. This cable through neglect is often allowed to run slack and therefore there is a loss in speed, with the result that there is a difference in the turns per inch put into the finished yarn.

In carrying into effect the present invention we employ two loose belt or cable pulleys and one fixed pulley—placed in the usual position on the driving shaft of the machine. To the fixed and one loose pulley we secure pulleys or chain wheels of different diameters, the larger wheel being carried by the loose pulley.

We may use only one chain wheel which in this case would be secured to one of the loose pulleys.

In both arrangements the chain wheel secured to the driving pulley or pulleys gives motion to a double chain wheel running loose, on a shaft, or this double chain wheel may be secured to a shaft, and placed in any convenient position at the gearing end of the machine. When two chain wheels are employed on the driving shaft the small chain wheel secured to the fixed pulley gives the slow speed to the tin roller, and the larger wheel secured to the loose pulley the quick speed.

When a single chain wheel is employed to drive the double chain wheels, the slow speed is given direct by the fixed driving pulley as usual, the quick speed is obtained through the chain wheel secured to the loose pulley being connected up with one of the double chain wheels, the other chain wheel being connected with a chain wheel fixed on the driving shaft, or this chain wheel may be coupled up to the tin roller wheel of the machine in conjunction with a ball or roller free wheel.

The positive drive for the second tin roller is obtained by a spur wheel attached to the double chain wheel gearing into another spur wheel fixed to the tin roller shaft.

The speed is altered by the strap fork being moved on to the required pulley either by hand or automatically, by being connected up to the nose peg, builder motion, ring rail, or any convenient moving part of the machine.

In order that our invention may be more clearly understood we illustrate the same applied to a ring spinning or doubling frame, having two tin rollers. It must however, be understood that the arrangement applies also to single tin roller frames.

Fig. 3 is a view similar to Fig. 2, but illustrating a modified form of mechanism;

Fig. 4 is a side elevation of that portion of the improved mechanism known as the "tin roller pedestal", showing the manner of mounting the shaft when a double pulley is employed; and Fig. 5 is a vertical section taken approximately on the line 5—5 of Fig. 4, the gears being shown in full lines.

Figure 1:
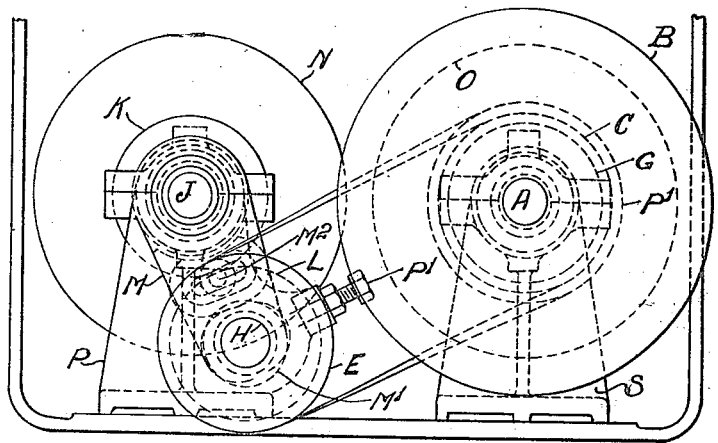
Fig. 1 is a side elevation of a driving mechanism embodying the present invention.
Figure 2:
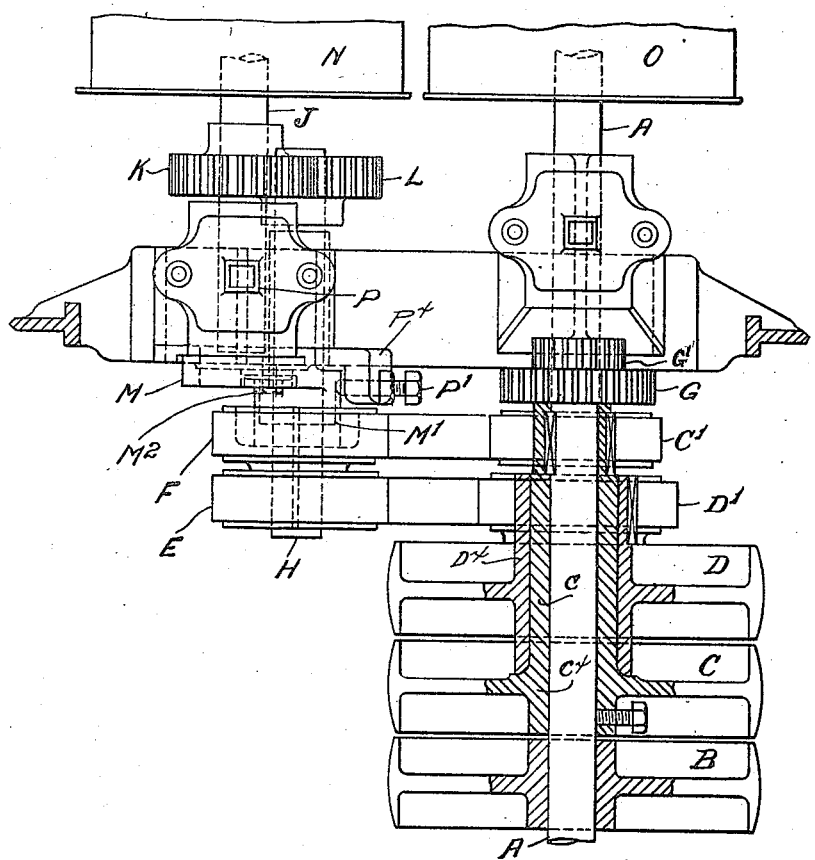
Fig. 2 is a partly sectional plan view thereof.

Referring to the drawings, and particularly to Figs. 1 and 2, the driving shaft A is mounted for rotation in bearings at the upper end of a standard S carried by the frame work of the machine. this shaft having secured thereto for rotation therewith a pair of gears G, G' for transmitting the motion of the shaft to mechanism not shown herein. since it forms no part of the present invention.

Mounted on the driving shaft A is a pulley C, which is secured to the shaft for imparting motion thereto from any suitable source of power, said pulley being provided with an elongated hub or sleeve $C^x$, on which is mounted a loose pulley D, which is itself provided with an elongated hub or sleeve $D^x$ for a purpose hereinafter to be described. A third pulley B is mounted loosely on the shaft A adjacent to the pulley C, on which pulley B the belt rides when no motion is to be imparted to the shaft.

Carried on the framework of the machine is a second standard P, in which is mounted for rotation in parallelism with the driving shaft, a shaft J, having secured at one end thereof a "tin roller" N which is adapted to receive motion from the positively driven tin roller O carried at the end of the driving shaft A.

As will be seen in Fig. 2, the sleeve $C^x$ of the fast pulley C extends beyond that of the pulley D and carries on the end of said extension a chain or belt pulley C', while on the elongated hub or sleeve $D^x$ of the pulley D is secured a second chain or belt pulley D' of larger diameter than the pulley C'.

Referring now to Figs. 4 and 5, the standard P is provided at one side thereof, adjacent to its upper end, with an annular boss $P^2$ forming a trunnion concentric with the shaft J, and on which trunnion is mounted for swinging movement a depending bracket M, which in turn is provided at its lower end with an annular boss M', in which is mounted for rotation a shaft H carrying at one end a pair of pulleys E and F of equal diameter and adapted to receive motion respectively from the pulleys D' and C'. The shaft H extends through a slot in the standard P and carries at its opposite end a pinion L in mesh with a pinion K secured on the shaft J. For taking up the slack of the connecting chains or belts between the pulleys E, F and D', C', the standard P is provided with a lug $P^x$ through which is threaded a set screw P', the inner end of which engages with the boss M' of the bracket M, whereby the latter may be swung on its trunnion in a direction away from the pulleys C' and D', thus tightening the chains or belts in a manner which will be readily understood. For securing the bracket M at any adjusted position, a stud carried by the standard P projects through a slot in the bracket, and on the outer end of said stud is threaded a nut $M^2$ adapted to clamp the bracket against the standard P and thus retain said bracket in its adjusted position.

With the mechanism so far described, when the driving belt is on the pulley B it will be seen that no motion is imparted to the shaft A. When, however, the belt is shifted to the fast pulley C motion is imparted directly to the machine by means of the rotation of the shaft A with gears G, G', such motion being transmitted to shaft H by means of pulleys C' and F, and from shaft H, by means of the spur gears L and K, to the shaft J, whereby the second tin roller is rotated. After the base of the cop has been built up and it is desired to increase the speed of the spindles, the driving belt is moved on to the loose pulley D, which carries the larger pulley D'. Motion is then imparted first to the shaft H, by means of the pulleys D' E, and since the pulley D' is larger than the pulley C', the shaft H will be rotated at greater speed than when driven from the pulley C', and such motion is transmitted back to the shaft A by means of pulleys F, C', thus rotating the latter shaft and its gears at greater speed than when driven directly by the driving pulley C, an increased speed of rotation being also imparted to the tin roller shaft J by means of the spur gears K, L.

The structure shown in Fig. 3 is similar to that of Fig. 2. In this form, however, the pulley C' is secured directly to the driving shaft A instead of on the sleeve of the fast pulley C and the shafts H and J are elongated so as to extend within the ends of the frame (not shown), the spur gears L and K being secured to said shafts at the same side of the standard P as the pulleys E and F are located, instead of at the opposite side as in Fig. 2. The operation of the mechanism is identical with that hereinbefore described.

Having thus described our invention, what we claim is:

1. In a machine of the class described, the combination of a pair of shafts disposed in parallelism, a pair of driving pulleys carried by one of said shafts, one secured to the shaft for rotation therewith and the other rotatable independently of the shaft, a pair of intermediate pulleys also carried by said shaft one for rotation by the fast driving pulley and the other for rotation by the loose driving pulley, one of said intermediate pulleys being of larger diameter than the other, a compensating shaft disposed between said pairs of shafts and in parallelism therewith, said compensating shaft being mounted in a movable bearing thereby to permit variation of the distance between it and the pulley-carrying shaft, a pair of pulleys of equal diameter secured to the compensating shaft each in alinement with one of said intermediate pulleys, belts connecting the pulleys on the compensating shaft with said intermediate pulleys, and gearing between said compensating shaft and the other shaft of the pair for transmitting motion to the latter.

2. In a machine of the class described, the combination of a pair of shafts disposed in parallelism, a driving pulley secured to one of said shafts and provided with an elongated sleeve, a driving pulley loosely mounted on said sleeve and also provided with an elongated sleeve, a pair of intermediate pulleys, one secured to the sleeve of the fast driving pulley and the other to the sleeve of the loose driving pulley, one of said intermediate pulleys being of larger diameter than the other, the compensating shaft disposed between said pair of shafts and in parallelism therewith, said compensating shaft being mounted in a movable bearing thereby to permit variation of the distance between it and the pulley-carrying shaft, a pair of pulleys of equal diameter secured to said compensating shaft each in alinement with one of said intermediate pulleys, belts connecting the pulleys on the compensating shaft with said intermediate pulleys, means for adjusting the compensating shaft, and means between said compensating shaft and the other shaft of the pair for transmitting motion to the latter.

In testimony whereof we have signed our names to this specification.

JOHN GEORGE BARKE.
FREDERIC HARDMAN.